(12) United States Patent
Karlapudi

(10) Patent No.: US 10,643,022 B2
(45) Date of Patent: May 5, 2020

(54) PDF EXTRACTION WITH TEXT-BASED KEY

(71) Applicant: Fannie Mae, Washington, DC (US)

(72) Inventor: Akash Karlapudi, Ashburn, VA (US)

(73) Assignee: Fannie Mae, Washington, DC (US)

( * ) Notice: Subject to any disclaimer, the term of this patent is extended or adjusted under 35 U.S.C. 154(b) by 14 days.

(21) Appl. No.: 16/040,285

(22) Filed: Jul. 19, 2018

(65) Prior Publication Data

US 2020/0026749 A1    Jan. 23, 2020

(51) Int. Cl.
*G06F 17/00* (2019.01)
*G06F 40/106* (2020.01)
*G06F 40/166* (2020.01)

(52) U.S. Cl.
CPC .......... *G06F 40/106* (2020.01); *G06F 40/166* (2020.01)

(58) Field of Classification Search
CPC ...... G06F 17/212; G06F 17/24; G06F 40/106; G06F 40/166; G06F 40/117; G06F 16/986
USPC ....................................................... 715/248
See application file for complete search history.

(56) References Cited

U.S. PATENT DOCUMENTS

| | | | | |
|---|---|---|---|---|
| 7,783,983 | B1 * | 8/2010 | Mayers | G06F 3/0481 715/764 |
| 2006/0041834 | A1 * | 2/2006 | Chen | G06F 16/986 715/205 |
| 2006/0294069 | A1 * | 12/2006 | Carlson | G06F 16/248 |
| 2012/0102388 | A1 * | 4/2012 | Fan | G06F 17/218 715/234 |
| 2012/0221582 | A1 * | 8/2012 | Boross | G06F 16/2282 707/752 |

* cited by examiner

*Primary Examiner* — Jason T Edwards
(74) *Attorney, Agent, or Firm* — Michael Best & Friedrich LLP (57) ABSTRACT

The present disclosure includes a computing device for extracting information from a standardized PDF report in a non-paragraph format. In one embodiment, the computing device includes an electronic processor, and a memory. The memory includes program instructions that, when executed by the electronic processor, cause the electronic processor to receive a standardized PDF report and a configuration file, determine X coordinates and Y coordinates of bounding boxes associated with one or more text-based keys, determine one or more words in the standardized PDF report that share the Y coordinates of the bounding boxes associated with a first text-based key, sort the one or more words in the standardized PDF report that share the Y coordinates of the bounding boxes based on respective X coordinates, determine a single word that is directly adjacent to the first text-based key, and control a display to display the single word.

20 Claims, 7 Drawing Sheets

| metric | page | param |
|---|---|---|
| Cash | 1 | 750 |
| Segregated Cash | 1 | 760 |
| AR - brokers & dealers, clearing firms | 1 | 770+790+800+810 |
| AR - customers/non-customers | 1 | 820+830 |
| B/As, CDs, & CP | 1 | 370 |
| US Gov't & Canadian Gov't | 1 | 380 |
| State & Municipal | 1 | 390 |
| Corporate debt | 1 | 400 |
| Corporate equity securities | 2 | 410 |
| Options | 2 | 420 |
| Other securities | 2 | 422+424+430 |

FIG. 7

PDF EXTRACTION WITH TEXT-BASED KEY

BACKGROUND

The present disclosure relates to portable document format (PDF) extraction (also referred to as "PDF extraction program"), and more specifically, the present disclosure relates to information extraction from a standardized PDF report in a non-paragraph format.

A PDF is based on PostScript language and captures a complete description of a fixed-layout flat document. A fixed-layout flat document includes not only the content such as text and images, but also metadata including a position (x and y coordinates) of a specific content and a font of the specific content.

SUMMARY

PDF extraction with a text-based key is disclosed. In one example, a PDF extraction program uses rules for word margin, as described, e.g., in FIG. 1 below, with a text-based key as specified in a configuration file (see, e.g., FIG. 7). The PDF extraction program extracts correct information even when a standardized PDF report does not align with the positioning patterns associated with a sample selection of standardized PDF reports because the PDF extraction program extracts the value directly adjacent to the text-based key instead of relying on the positioning patterns. The PDF extraction program also prevents the extraction of neighboring text because the PDF extraction program uses the text-based key instead of the positioning patterns. Moreover, the PDF extraction program does not require a setup process because the PDF extraction program only requires a user to use the correct configuration file. Finally, the PDF extraction program is readily adjustable when the text-based key in the standardized PDF report is changed by updating a value associated with the text-based key to reflect the change to the text-based key.

In one embodiment, the present disclosure includes a computing device. The computing device includes an electronic processor, and a memory coupled to the electronic processor. The memory includes program instructions that, when executed by the electronic processor, cause the electronic processor to receive a standardized PDF (portable document format) report that is in a non-paragraph format and a configuration file including one or more values that correspond to one or more text-based keys in the standardized PDF report, determine X coordinates and Y coordinates of bounding boxes associated with the one or more text-based keys, the X coordinates associated with an X-direction and the Y coordinates associated with a Y-direction, determine one or more words in the standardized PDF report that share the Y coordinates of the bounding boxes associated with a first text-based key of the one or more text-based keys, sort the one or more words in the standardized PDF report that share the Y coordinates of the bounding boxes associated with the first text-based key based on respective X coordinates in the X-direction, determine a single word from the one or more words that is directly adjacent to the first text-based key, and control a display to display the single word that is directly adjacent to the first text-based key.

In another embodiment, the present disclosure includes a system. The system includes a display device and a server communicatively connected to the display device. The server includes an electronic processor; and a memory coupled to the electronic processor. The memory includes program instructions that, when executed by the electronic processor, cause the electronic processor to receive a standardized PDF (portable document format) report that is in a non-paragraph format and a configuration file including one or more values that correspond to one or more text-based keys in the standardized PDF report, determine X coordinates and Y coordinates of bounding boxes associated with the one or more text-based keys, the X coordinates associated with an X-direction and the Y coordinates associated with a Y-direction, determine one or more words in the standardized PDF report that share the Y coordinates of the bounding boxes associated with a first text-based key of the one or more text-based keys, sort the one or more words in the standardized PDF report that share the Y coordinates of the bounding boxes associated with the first text-based key based on respective X coordinates in the X-direction, determine a single word from the one or more words that is directly adjacent to the first text-based key, and control a display to display the single word that is directly adjacent to the first text-based key.

In another embodiment, the present disclosure includes a non-transitory computer-readable medium. The non-transitory computer-readable medium includes program instructions that, when executed by an electronic processor, cause the electronic processor to perform a set of operation. The set of operations includes receiving a standardized PDF (portable document format) report that is in a non-paragraph format and a configuration file including one or more values that correspond to one or more text-based keys in the standardized PDF report. The set of operations includes determining X coordinates and Y coordinates of bounding boxes associated with the one or more text-based keys, the X coordinates associated with an X-direction and the Y coordinates associated with a Y-direction. The set of operations includes determining one or more words in the standardized PDF report that share the Y coordinates of the bounding boxes associated with a first text-based key of the one or more text-based keys. The set of operations includes sorting the one or more words in the standardized PDF report that share the Y coordinates of the bounding boxes associated with the first text-based key based on respective X coordinates in the X-direction. The set of operations includes determining a single word from the one or more words that is directly adjacent to the first text-based key. The set of operations also including controlling a display to display the single word that is directly adjacent to the first text-based key.

In yet another embodiment, the present disclosure includes a method for extracting information from a standardized PDF (portable document format) report that is in a non-paragraph format. The method includes receiving, with an electronic processor, the standardized PDF report that is in the non-paragraph format and a configuration file including one or more values that correspond to one or more text-based keys in the standardized PDF report. The method includes determining, with the electronic processor, X coordinates and Y coordinates of bounding boxes associated with the one or more text-based keys, the X coordinates associated with an X-direction and the Y coordinates associated with a Y-direction. The method includes determining, with the electronic processor, one or more words in the standardized PDF report that share the Y coordinates of the bounding boxes associated with a first text-based key of the one or more text-based keys. The method includes sorting, with the electronic processor, the one or more words in the standardized PDF report that share the Y coordinates of the bounding boxes associated with the first text-based key based on respective X coordinates in the X-direction. The method includes determining, with the electronic processor, a single word from the one or more words that is directly adjacent to the first text-based key. The method also includes controlling, with the electronic processor, a display to display the single word that is directly adjacent to the first text-based key.

Other aspects of the present disclosure will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not described herein. Furthermore, some embodiments described herein may include one or more electronic processors configured to perform the described functionality by executing instructions stored in a non-transitory computer-readable medium. Similarly, embodiments described herein may be implemented as non-transitory, computer-readable medium storing instructions executable by one or more electronic processors to perform the described functionality. Described functionality can be performed in a client-server environment, a cloud computing environment, a local-processing environment, or a combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Further, terms such as "first", "second", and "third" are used herein for purposes of description and are not intended to indicate or imply relative importance or significance.

A conventional digital PDF extractor gathers a sample selection of standardized PDF reports that represent the universe of standardized PDF reports that will be used to extract information. The conventional digital PDF extractor finds positioning patterns (i.e., patterns in the x and y coordinates) in the sample selection of standardized PDF reports regarding the information to be extracted. The conventional digital PDF extractor then extracts information from a desired standardized PDF report based on the positioning patterns found in the sample selection of standardized PDF reports.

However, the conventional digital PDF extractor has several disadvantages. First, the conventional digital PDF extractor will extract incorrect information from a standardized PDF report that does not align with the positioning patterns found in the sample selection of standardized PDF reports. Second, the conventional digital PDF extractor will also extract neighboring text when the neighboring text bleeds into the bounding boxes associated with the positioning patterns. Third, the conventional digital PDF extractor requires a setup process (i.e., the gathering, finding, and training as described above) by a technically-inclined user (for example, an Information Technology (IT) professional) before the conventional digital PDF extractor can be used by a regular user. Lastly, the conventional digital PDF extractor is effectively broken after the slightest change to the format in a standardized PDF report and requires another setup process by the technically-inclined user.

For the reasons above, the conventional digital PDF extractor is impractical and the current process to extract information from standardized PDF reports requires analysts to manually go through each PDF to copy and paste information from the standardized PDF format into a database. The PDF extraction program of the present disclosure automates the entire process, reduces the likelihood of human error by the analysts, and greatly frees up the analysts' time for other tasks.

In one example, the disclosed PDF extraction program solves the above disadvantages using a text-based key. For example, the PDF extraction program uses rules for word margin, as described in FIG. 1 below, with a text-based key as specified in a configuration file (see FIG. 7). The PDF extraction program will extract the correct information even when a standardized PDF report does not align with the positioning patterns associated with a sample selection of standardized PDF reports because the PDF extraction program extracts the value directly adjacent to the text-based key instead of relying on the positioning patterns. The PDF extraction program also prevents the extraction of neighboring text because the PDF extraction program does not rely on the positioning patterns. Additionally, the PDF extraction program does not require a setup process because the PDF extraction program only requires a user to use the correct configuration file. Finally, the PDF extraction program is readily adjustable when the text-based key in the standardized PDF report is changed by updating a value associated with the text-based key to reflect the change to the text-based key.

Figure 1:
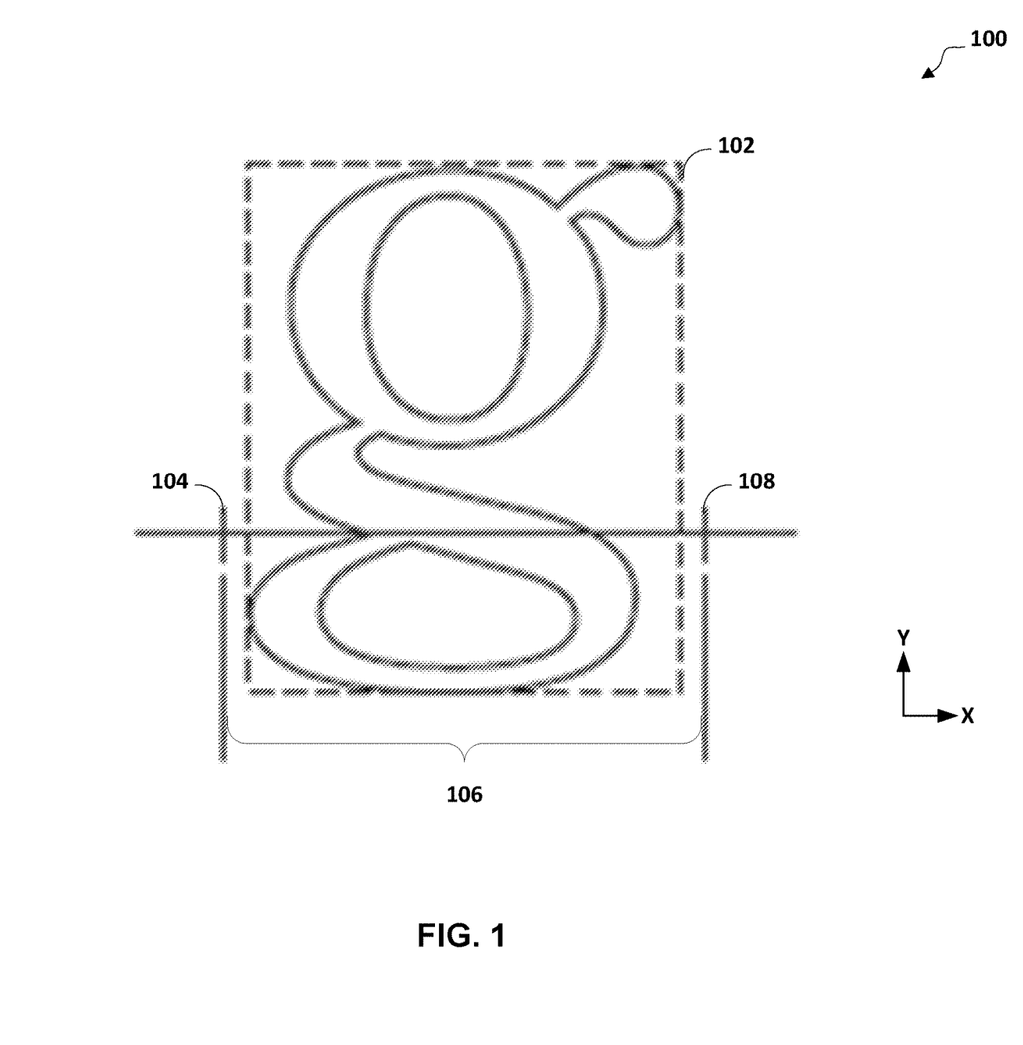
FIG. 1 is a diagram that illustrates a PDF glyph.

FIG. 1 is a diagram that illustrates a PDF glyph 100. In the illustrative example of FIG. 1, the PDF glyph 100 includes a bounding box 102, a glyph origin 104, and a glyph width 106. The glyph width 106 is a distance in the x-direction between the glyph origin 104 and an origin 108 of the next glyph. The bounding box 102 is represented as an x and y coordinates for the top left and the bottom right of the box with respect to the x and coordinates of the overall page. Every glyph in a PDF has a bounding box.

Figure 2:
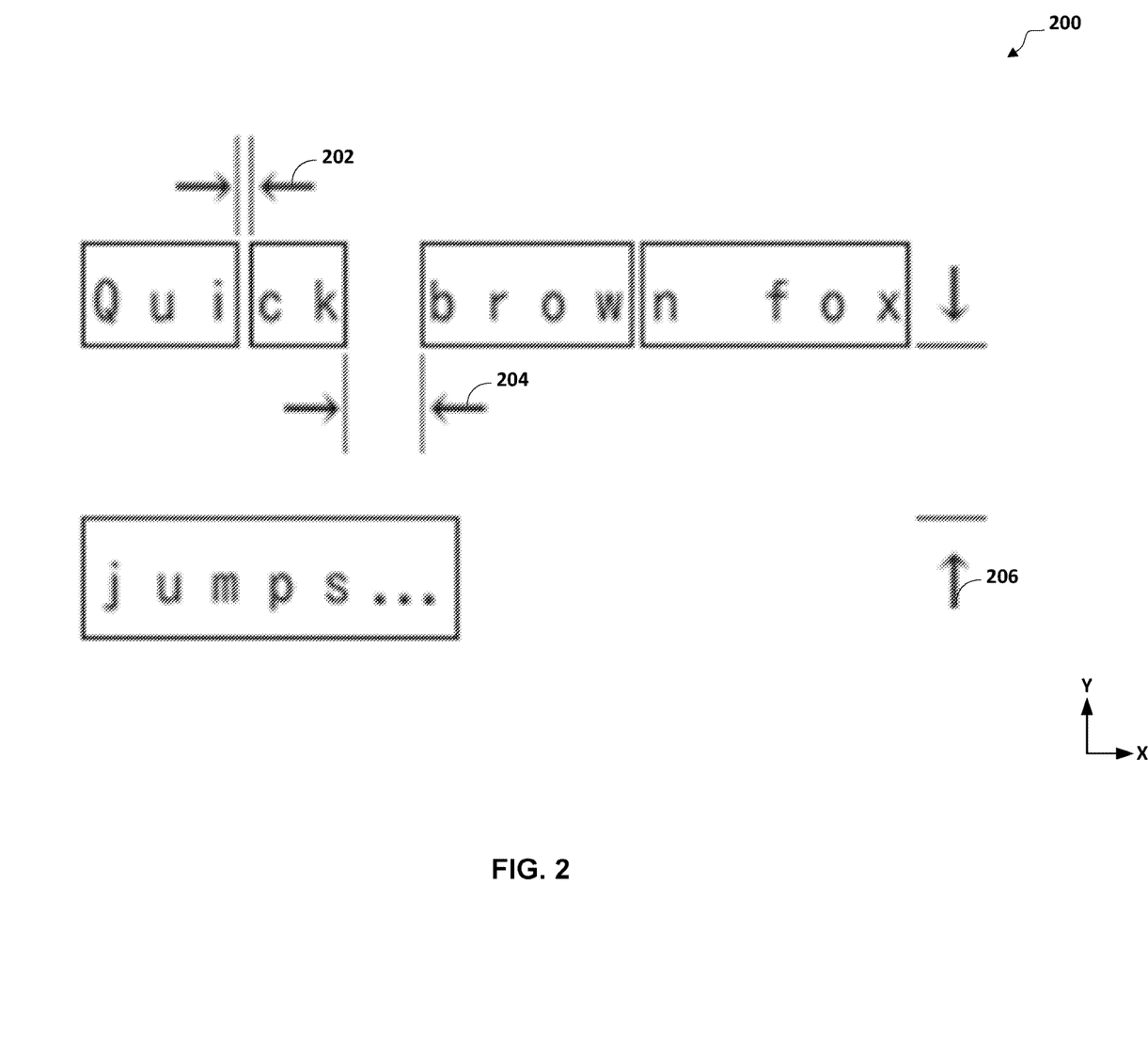
FIG. 2 is a diagram that illustrates a PDF layout.

FIG. 2 is a diagram that illustrates a PDF layout 200. In the example of FIG. 2, the PDF layout 200 includes a letter margin 202, a word margin 204, and a line margin 206. The letter margin 202 and the word margin 204 are distances in the x-direction and are based on the distance between the bounding boxes of two glyphs. The letter margin 202 is equal to a first distance. Comparatively, the word margin 204 is greater than the first distance and equal to a second distance. The first distance and the second distance are based on formatting (for example, font type, letter size, justification, or other suitable formatting attribute) of the PDF page that is defined by default values or user-specified values.

The line margin 206 is a distance in the y-direction between bounding boxes of glyphs in a first line and bounding boxes of glyphs in a second line. In the illustrative example of FIG. 2, the line margin 206 is greater than the first distance and the second distance and equal to a third distance. The third distance is also based on formatting (for example, font type, letter size, justification, or other suitable formatting attribute) of the PDF page that is defined by default values or user-specified values.

Figure 3:
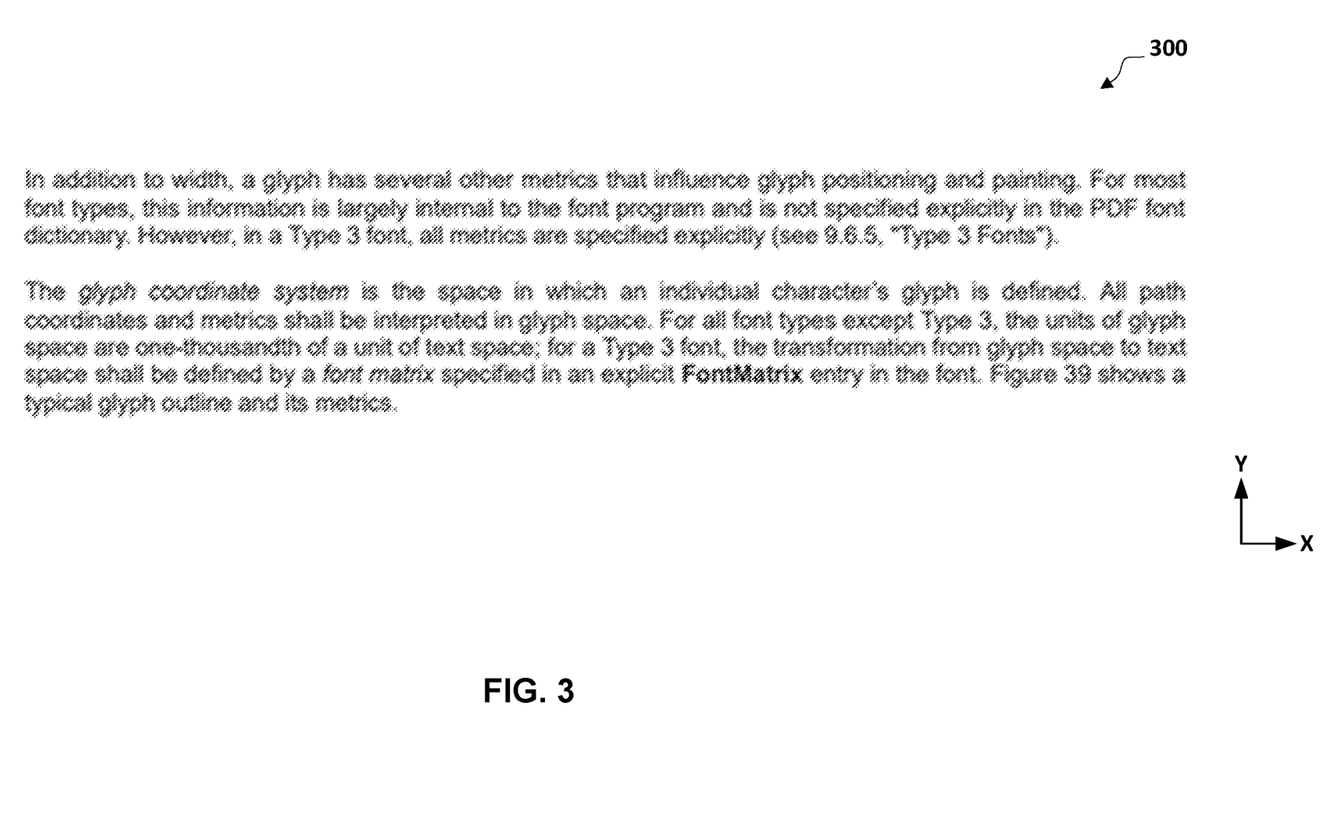
FIG. 3 is a diagram that illustrates a PDF in a paragraph format.

The letter margin 202, the word margin 204, and the line margin 206 are set of rules that allow for the extraction of text in a human readable format when the text is in a paragraph format as illustrated in FIG. 3. However, this set of rules fails to properly extract text when the text is in a report format.

Figure 4:
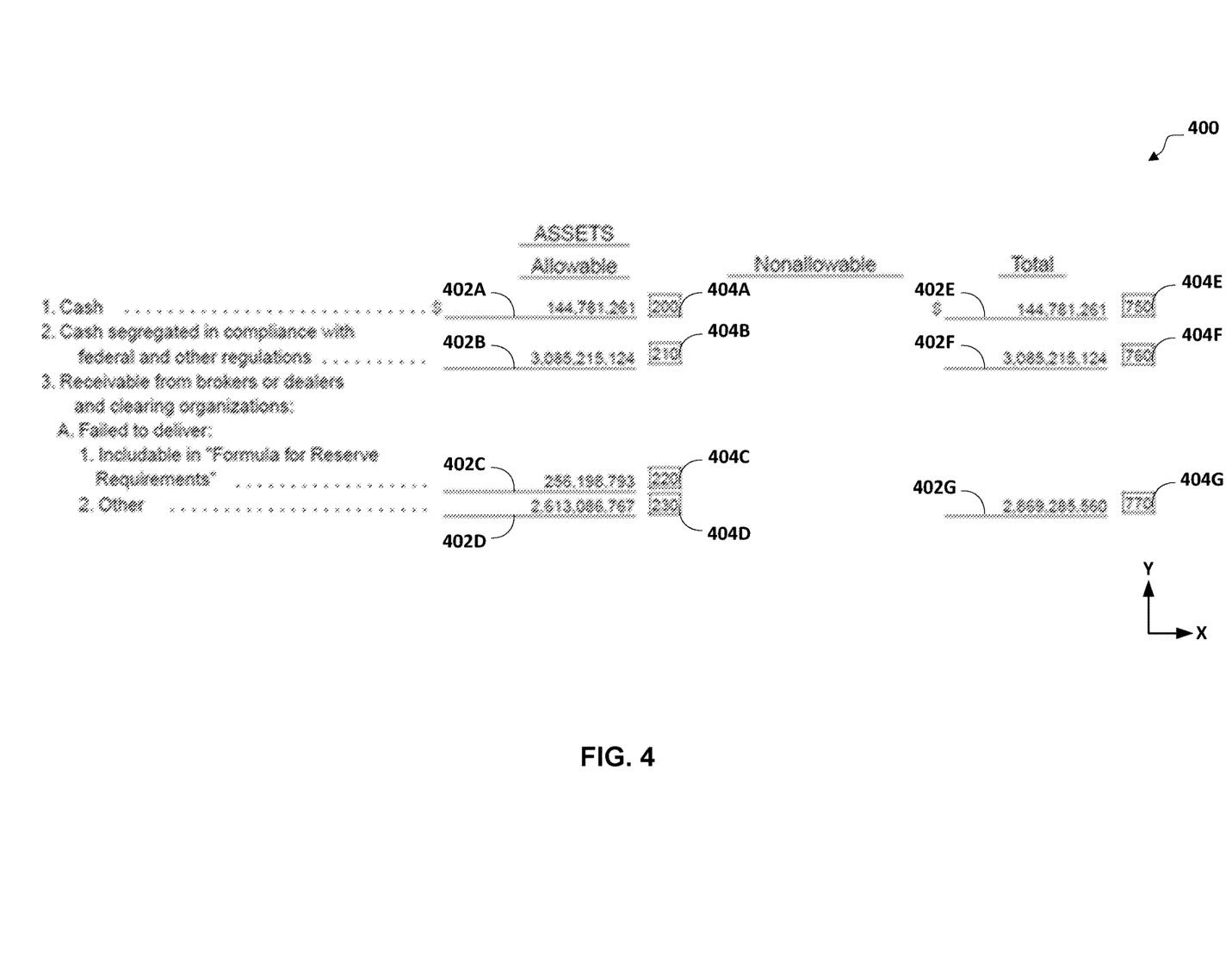
FIG. 4 is a diagram that illustrates a standardized PDF report in a non-paragraph format.

FIG. 4 is a diagram that illustrates a standardized PDF report 400 in a non-paragraph format. The standardized PDF report 400 is a standardized focus report including a plurality of values 402A-402G and a plurality of field codes 404A-404G that correspond to the plurality of values 402A-402G. In some examples, the standardized PDF report 400 is an SEC FOCUS report (form X-17A-5) for a company quarterly filing.

Further, PDFs of standardized reports in a non-paragraph format may differ based on the type of information contain in the standard reports. These variations increase the setup time and complexity of the conventional PDF extractor.

To solve the disadvantages of the conventional digital PDF extractor as described above, the PDF extraction program uses each of the plurality of field codes 404A-404G as text-based keys that correspond to the plurality of values 404A-404G in addition to the rules for the word margin as described above in FIG. 2.

Figure 5:
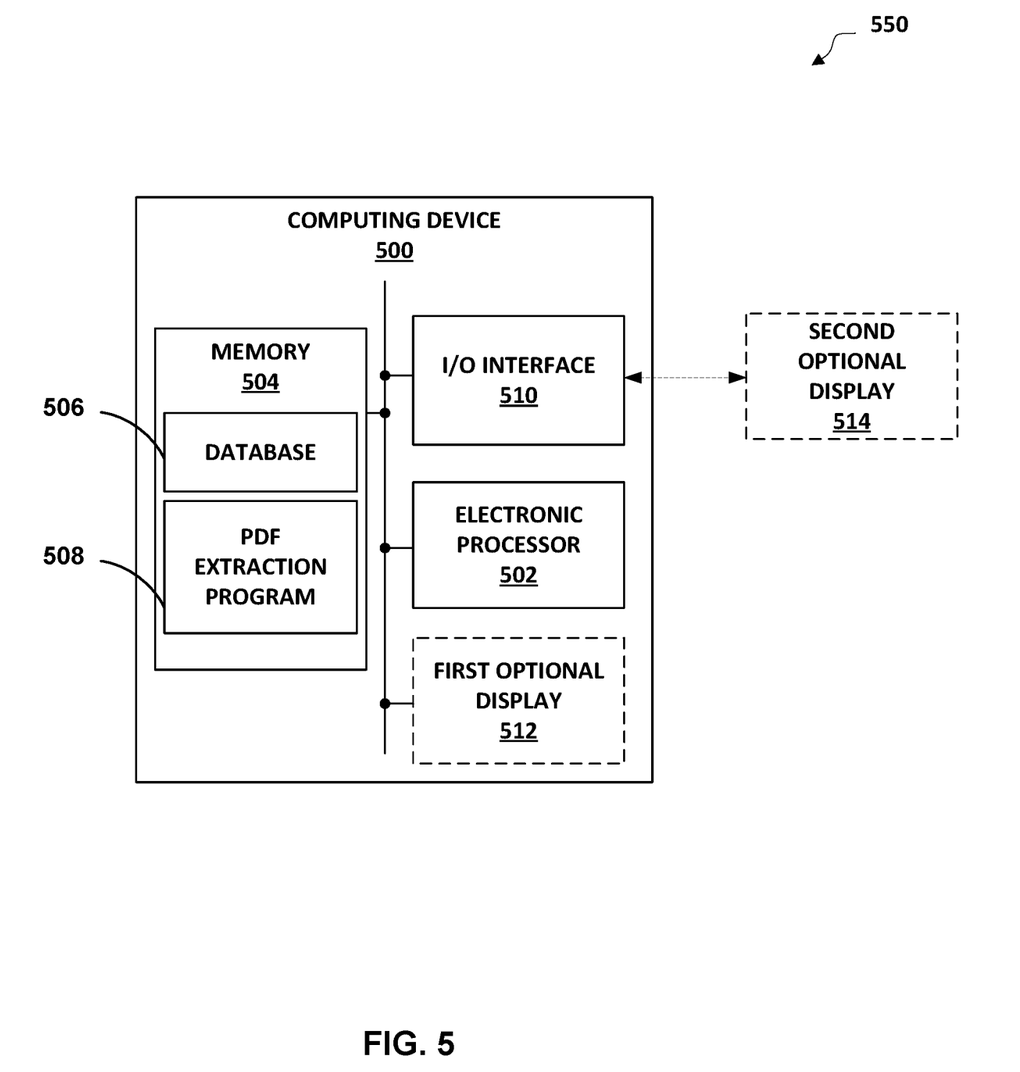
FIG. 5 is a block diagram of a computing device, in accordance with various embodiments of the present disclosure.

FIG. 5 is a block diagram of a computing device 500 that includes a PDF extraction program 508. In some examples, the computing device 500 is a server that provides a virtual environment to a large number of users (for example, hundreds or thousands of users). In other examples, the computing device 500 is a personal computer, a mobile smartphone, a tablet, or other suitable computing device. It should be understood that, in some embodiments, there may be more than one computing device in configurations different from that illustrated in FIG. 5.

In the example of FIG. 5, the computing device 500 includes an electronic processor 502 (for example, a microprocessor or another suitable processing device), a memory 504 (for example, a non-transitory computer-readable storage medium), an input/output (I/O) interface 510, a first optional display 512, and a second optional display 514. It should be understood that, in some embodiments, the computing device 500 may include fewer or additional components in configurations different from that illustrated in FIG. 5. Also the computing device 500 may perform additional functionality than the functionality described herein. In addition, the functionality of the computing device 500 may be incorporated into other computing devices or other servers. As illustrated in FIG. 5, the electronic processor 502, the memory 504, the I/O interface 510, and the first optional display 512 are electrically coupled by one or more control or data buses enabling communication between the components of the computing device 500.

The memory 504 may include a program storage area (for example, read only memory (ROM)) and a data storage area (for example, random access memory (RAM), and other non-transitory, computer-readable medium). In some examples, the program storage area may store a database 506 and computer-readable instructions regarding a pdf extraction program 508.

The electronic processor 502 executes the computer-readable instructions stored in the memory 504. For example, the electronic processor 502 may execute the computer-readable instructions stored in the memory 504 to perform the pdf extraction program 508 by extracting information from a standardized PDF report in a non-paragraph format and storing the information that is extracted in the database 506 as described in greater detail in FIG. 6.

The I/O interface 510 receives data from and provides data to devices external to the computing device 500. For example, the I/O interface 510 receives data from and provides data to the second optional display 514 when the computing device 500 is part of a larger system 550 that includes the second optional display 514. In some examples, the I/O interface 510 may include a port or connection for receiving a wired connection (for example, an Ethernet cable, fiber optic cable, a telephone cable, or the like), a wireless transceiver, or a combination thereof.

Figure 6:
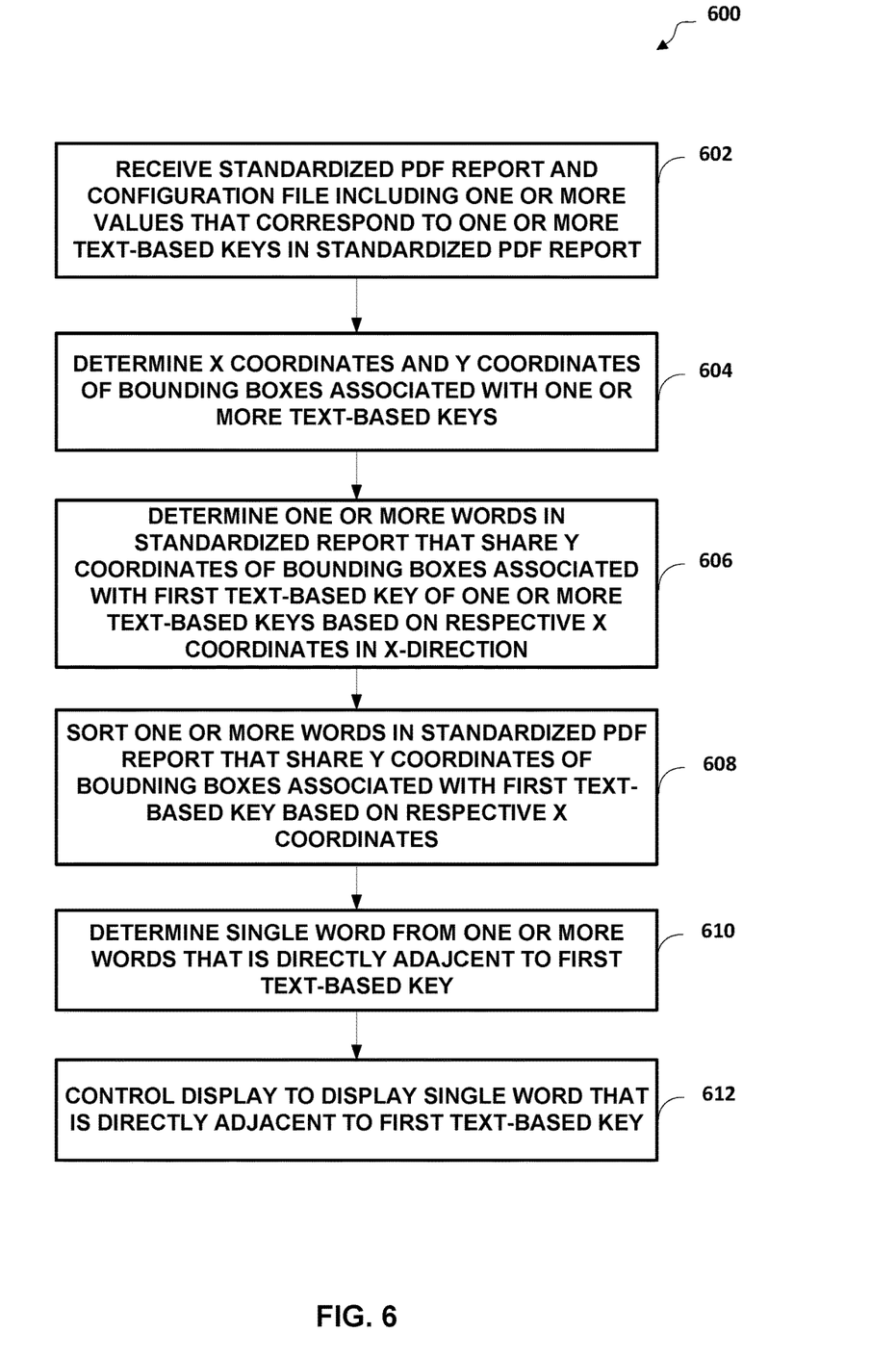
FIG. 6 is a flowchart of a method for extracting information from a standardized PDF report in a non-paragraph format, in accordance with various embodiments of the present disclosure.

FIG. 6 is a flowchart of a method 600 that extracts information from a standardized PDF report in a non-paragraph format. For ease of understanding, FIG. 6 is described with respect to the standardized PDF report 400 of FIG. 4 and the computing device 500 of FIG. 5. However, the method 600 is not limited to the standardized PDF report 400 or the computing device 500 of FIG. 5. Instead, the method 600 may be applied to any standardized PDF report that is in a non-paragraph format and includes one or more text-based keys.

In the example of FIG. 6, the method 600 includes receiving, with an electronic processor, the standardized PDF report and a configuration file (as described in FIG. 7 below) including one or more values that correspond to one or more text-based keys in the standardized PDF report (at block 602). For example, the electronic processor 502 receives the standardized PDF report 400 and a configuration file that includes a value of "750" from a user via the I/O interface 510. The value of "750" corresponds to field code 404E from the plurality of field codes 404A-404G in the standardized PDF report 400. In some examples, the electronic processor 502 stores the configuration file in the memory 504.

Additionally, in some examples, receiving, with the electronic processor, the standardized PDF report and the configuration file including the one or more values that correspond to the one or more text-based keys in the standardized PDF report further includes generating, with the electronic processor, a graphical user interface to prompt the user to upload the standardized PDF report and the configuration file. In some examples, the graphical user interface is a web interface.

The method 600 includes determining, with the electronic processor, X coordinates and Y coordinates of bounding boxes associated with the one or more text-based keys, the X coordinates associated with an X-direction and the Y coordinates associated with a Y-direction (at block 604). For example, the electronic processor 502 determines X coordinates and Y coordinates of the bounding boxes associated with the field code 404E.

The method 600 includes determining, with the electronic processor, one or more words in the standardized PDF report that share the Y coordinates of the bounding boxes associated with a first text-based key of the one or more text-based keys (at block 606). For example, the electronic processor 502 determines that "1. Cash . . . $144,781,261 200 $144,781,261" are words that share the Y coordinates of the bounding boxes associated with the field code 404E.

The method 600 includes sorting, with the electronic processor, the one or more words in the standardized PDF report that share the Y coordinates of the bounding boxes associated with the first text-based key based on respective X coordinates in the X-direction (at block 608). For example, the electronic processor 502 sorts the words "1. Cash . . . $ 144,781,261 200 $144,781,261" based on the word "1." having the lowest X coordinates and the word "144,781,261" having the highest X coordinates.

The method 600 includes determining, with the electronic processor, a single word from the one or more words that is directly adjacent to the first text-based key (at block 610). For example, the electronic processor 502 determines that the single word "144,781,261" with the highest X coordinates is directly adjacent to (i.e., left of) the field code 404E.

The method 600 also includes controlling, with the electronic processor, a display to display the single word that is directly adjacent to the first text-based key (at block 612). For example, the electronic processor 502 controls the first optional display 512 or the second optional display 514 to display the single word "144,781,261" as the value associated with the total cash value 402E.

Additionally, in some examples, controlling, with the electronic processor, the display to display the single word that is directly adjacent to the first text-based key further includes generating, with the electronic processor, the graphical user interface to display the single word that is directly adjacent to the first text-based key.

Additionally, in some examples, the method 600 also includes storing the standardized PDF report, the configuration file, the single word that is directly adjacent to the first text-based key, or a combination thereof in a database. For example, the electronic processor 502 stores the standardized PDF report 400, the configuration file, and the single word "144,781,261" in the memory 504.

In some examples, the electronic processor 502 creates a new folder for every user request to upload a standardized PDF report and a configuration file to prevent any interference between simultaneous extraction processes. The electronic processor 502 stores the uploaded standardized PDF report and the uploaded configuration in the newly created folder.

In other examples, the electronic processor 502 creates a new folder for every user request to upload a plurality of standardized PDF reports and a configuration file to prevent any interference between simultaneous extraction processes. The electronic processor 502 stores the plurality of uploaded standardized PDF reports and the uploaded configuration in the newly created folder. In these examples, the electronic processor 502 checks for the number of files in the newly created folder. When the electronic processor 502 determines that the newly created folder has more than 2 files (e.g., a plurality of standardized PDF reports were uploaded), then the electronic processor 502 will read all the standardized PDF reports into an array and extracts one standardized PDF report at a time by performing the method 600.

Additionally, in some examples, the method 600 includes outputting, with the electronic processor, the single word in a document that is in a spreadsheet format (e.g., Excel). For example, the electronic processor 502 may generate an Excel spreadsheet including some or all of the single words that are stored in the memory 504.

Additionally, in some examples, the method 600 also includes detecting, with the electronic processor, an error in a user submission and generating, with the electronic processor, the graphical user interface to display one or more exceptions in response to detecting the error in the user submission. For example, the one or more exceptions may include a failure to select a standardized PDF report, a failure to select a configuration file, a failure to provide a standardized report in the portable document format, a failure to provide a configuration file in an excel format, a failure to detect text-based keys in the standardized PDF report from the values in the configuration file, an upload of more than one configuration file, or a combination thereof.

In some examples, the configuration file includes a single value that corresponds to only one of the plurality of field codes 404A-404G. In these examples, the method 600 is performed for the single value and corresponding single field code.

In other examples, the configuration file includes two values that correspond to only two of the plurality of field codes 404A-404G. In these examples, the method 600 is performed for the two values and corresponding field codes.

In yet other examples, the configuration file includes a plurality of values that correspond to the plurality of field codes 404A-404G. In these examples, the method 600 is performed for the plurality of values and the corresponding plurality of field codes 404A-404G.

Figure 7:
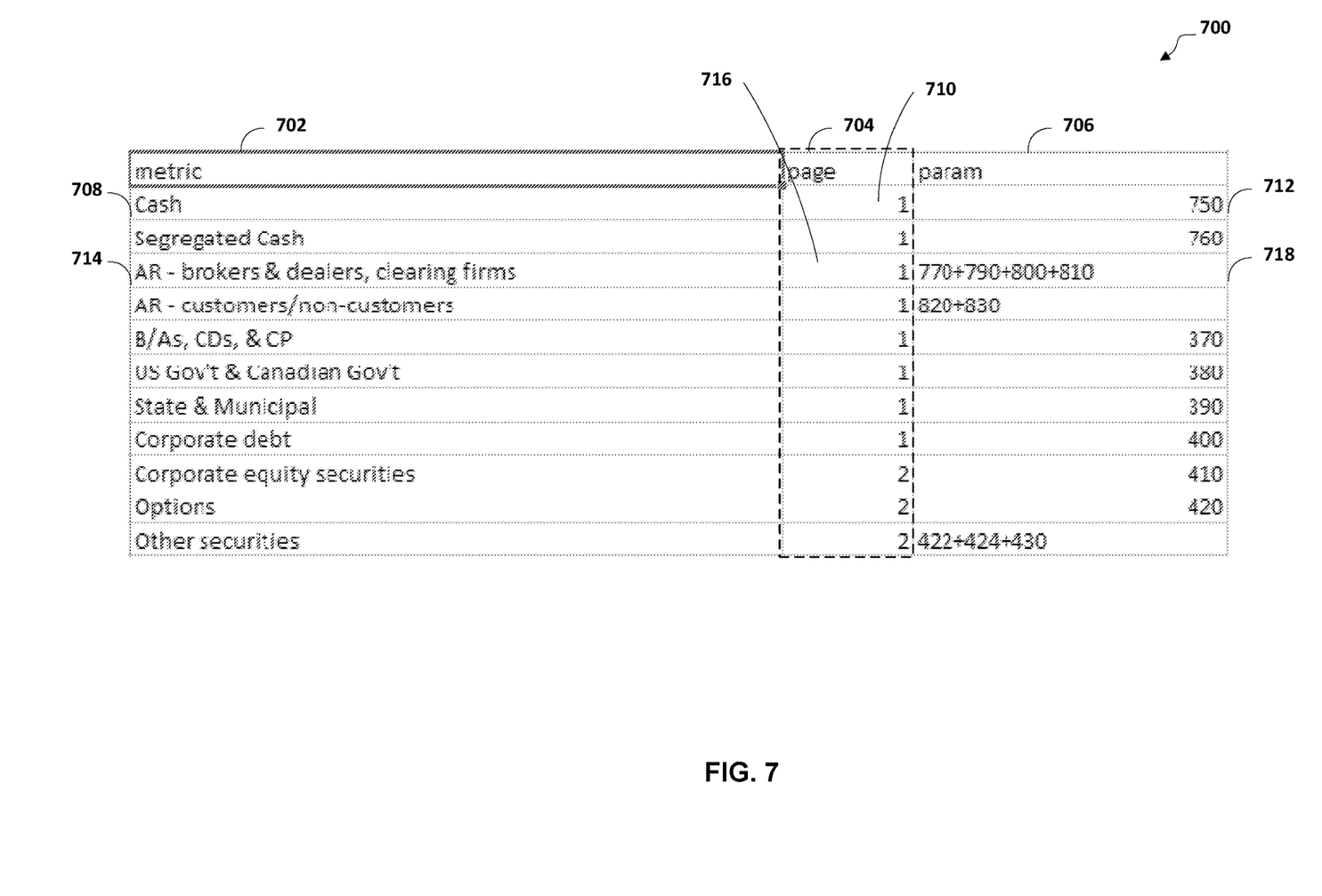
FIG. 7 is a diagram that illustrates one example of a configuration file, in accordance with various embodiments of the present disclosure.

FIG. 7 is a diagram that illustrates one example of a configuration file 700, in accordance with various embodiments of the present disclosure. As illustrated in FIG. 7, the configuration file 700 is an array including a metric column 702, an optional page column 704, and a parameter column 706.

In one row of the configuration file 700, the metric column 702 includes a "Cash" descriptor 708, the optional page column 704 includes a page "1" input 710, and the parameter column 706 includes the "750" value 712, which is the "750" text-based key corresponding to field code 404E as illustrated in FIG. 4 and described in FIG. 6.

Additionally, as illustrated in FIG. 7, in another row of the configuration file 700, the metric column 702 includes a "AR—brokers & dealers, clearing firms" descriptor 714, the optional page column 704 includes a page "1" input 716, and the parameter column 706 includes a "770+790+800+810" value 718, which are the text-based keys that generates a single word from several different field codes. For example, the "770+790+800+810" value 718 causes the electronic processor to add together the single words associated with the "770" text-based key, the "790" text-based key, the "800" text-based key, and the "810" text-based key. In other examples, different combinations of different text-based keys may be performed to generate a single word (e.g., additions, subtractions, multiplication, division, sorting, or other suitable combinations of single words).

In some examples, the optional page column 704 may be provided to speed up the processing of standardized reports and reduce the amount of resources needed by the server to process one or more standardized reports. For example, as illustrated in FIG. 7, the page "1" input 704 indicates the "750" value 712 is on the first page of the standardized report. In other examples, the page input 704 may include multiple pages when the parameter column 706 includes values from multiple pages in the standardized report. However, the optional page column 704 is not necessary to process a standardized report.

Accordingly, the present disclosure provides a new and useful PDF extraction program that completely automates the current PDF extraction tasks of a user and reduces the likelihood of human error. Various features and advantages of the present disclosure are set forth in the following claims.

What is claimed is:

1. A computing device comprising:
an electronic processor; and
a memory coupled to the electronic processor, the memory including program instructions that, when executed by the electronic processor, cause the electronic processor to
receive a standardized PDF (portable document format) report that is in a non-paragraph format and a configuration file including one or more values that correspond to one or more text-based keys in the standardized PDF report,
determine X coordinates and Y coordinates of bounding boxes associated with the one or more text-based keys, the X coordinates associated with an X-direction and the Y coordinates associated with a Y-direction,
determine one or more words in the standardized PDF report that share the Y coordinates of the bounding boxes associated with a first text-based key of the one or more text-based keys,
sort the one or more words in the standardized PDF report that share the Y coordinates of the bounding boxes associated with the first text-based key based on respective X coordinates in the X-direction,
determine a single word from the one or more words that is directly adjacent to the first text-based key, and
control a display to display the single word that is directly adjacent to the first text-based key,
wherein, to control the display to display the single word that is directly adjacent to the first text-based key, the program instructions, when executed by the electronic processor, further cause the electronic processor to generate a graphical user interface to display the single word that is directly adjacent to the first text-based key.

2. The computing device of claim 1, wherein the program instructions, when executed by the electronic processor, further cause the electronic processor to
determine a second one or more words in the standardized PDF report that share the Y coordinates of the bounding boxes associated with a second text-based key of the one or more text-based keys, wherein the second text-based key is different than the first text-based key,
sort the second one or more words in the standardized PDF report that share the Y coordinates of the bounding boxes associated with the second text-based key based on respective X coordinates in the X-direction,
determine a single word from the second one or more words that is directly adjacent to the second text-based key, and
control the display to display the single word that is directly adjacent to the first text-based key and the single word from the second one or more words that is directly adjacent to the second text-based key.

3. The computing device of claim 1, further comprising the display.

4. The computing device of claim 1, wherein the graphical user interface is a web interface.

5. A computing device comprising:
an electronic processor; and
a memory coupled to the electronic processor, the memory including program instructions that, when executed by the electronic processor, cause the electronic processor to
receive a standardized PDF (portable document format) report that is in a non-paragraph format and a configuration file including one or more values that correspond to one or more text-based keys in the standardized PDF report,
determine X coordinates and Y coordinates of bounding boxes associated with the one or more text-based keys, the X coordinates associated with an X-direction and the Y coordinates associated with a Y-direction,
determine one or more words in the standardized PDF report that share the Y coordinates of the bounding boxes associated with a first text-based key of the one or more text-based keys,
sort the one or more words in the standardized PDF report that share the Y coordinates of the bounding boxes associated with the first text-based key based on respective X coordinates in the X-direction,
determine a single word from the one or more words that is directly adjacent to the first text-based key, and
control a display to display the single word that is directly adjacent to the first text-based key,
wherein the memory further includes a database, and
wherein the program instructions, when executed by the electronic processor, further cause the electronic processor to store the single word that is directly adjacent to the first text-based key in the database.

6. The computing device of claim 5, wherein the program instructions, when executed by the electronic processor, further cause the electronic processor to store the standardized PDF report, the configuration file, the single word that is directly adjacent to the first text-based key, or a combination thereof in the database.

7. A system comprising:
a display device; and
a server communicatively connected to the display device, the server including
an electronic processor; and
a memory coupled to the electronic processor, the memory including program instructions that, when executed by the electronic processor, cause the electronic processor to receive a standardized PDF (portable document format) report that is in a non-paragraph format and a configuration file including one or more values that correspond to one or more text-based keys in the standardized PDF report, determine X coordinates and Y coordinates of bounding boxes associated with the one or more text-based keys, the X coordinates associated with an X-direction and the Y coordinates associated with a Y-direction, determine one or more words in the standardized PDF report that share the Y coordinates of the bounding boxes associated with a first text-based key of the one or more text-based keys, sort the one or more words in the standardized PDF report that share the Y coordinates of the bounding boxes associated with the first text-based key based on respective X coordinates in the X-direction, determine a single word from the one or more words that is directly adjacent to the first text-based key, and control a display to display the single word that is directly adjacent to the first text-based key, wherein, to control the display to display the single word that is directly adjacent to the first text-based key, the program instructions that, when executed by the electronic processor, further cause the electronic processor to generate a graphical user interface to display the single word that is directly adjacent to the first text-based key.

8. The system of claim 7, wherein the program instructions that, when executed by the electronic processor, further cause the electronic processor to determine a second one or more words in the standardized PDF report that share the Y coordinates of the bounding boxes associated with a second text-based key of the one or more text-based keys, wherein the second text-based key is different than the first text-based key, sort the second one or more words in the standardized PDF report that share the Y coordinates of the bounding boxes associated with the second text-based key based on respective X coordinates in the X-direction, determine a single word from the second one or more words that is directly adjacent to the second text-based key, and control the display to display the single word that is directly adjacent to the first text-based key and the single word from the second one or more words that is directly adjacent to the second text-based key.

9. The system of claim 7, wherein the graphical user interface is a web interface.

10. A system comprising:

a display device; and a server communicatively connected to the display device, the server including an electronic processor; and a memory coupled to the electronic processor, the memory including program instructions that, when executed by the electronic processor, cause the electronic processor to receive a standardized PDF (portable document format) report that is in a non-paragraph format and a configuration file including one or more values that correspond to one or more text-based keys in the standardized PDF report, determine X coordinates and Y coordinates of bounding boxes associated with the one or more text-based keys, the X coordinates associated with an X-direction and the Y coordinates associated with a Y-direction, determine one or more words in the standardized PDF report that share the Y coordinates of the bounding boxes associated with a first text-based key of the one or more text-based keys, sort the one or more words in the standardized PDF report that share the Y coordinates of the bounding boxes associated with the first text-based key based on respective X coordinates in the X-direction, determine a single word from the one or more words that is directly adjacent to the first text-based key, and control a display to display the single word that is directly adjacent to the first text-based key, wherein the memory further includes a database, and wherein the program instructions that, when executed by the electronic processor, further cause the electronic processor to store the single word that is directly adjacent to the first text-based key in the database.

11. The system of claim 10, wherein the program instructions that, when executed by the electronic processor, further cause the electronic processor to store the standardized PDF report, the configuration file, the single word that is directly adjacent to the first text-based key, or a combination thereof in the database.

12. A non-transitory computer-readable medium comprising instructions that, when executed by an electronic processor, cause the electronic processor to perform a set of operations comprising:

receiving a standardized PDF (portable document format) report that is in a non-paragraph format and a configuration file including one or more values that correspond to one or more text-based keys in the standardized PDF report;

determining X coordinates and Y coordinates of bounding boxes associated with the one or more text-based keys, the X coordinates associated with an X-direction and the Y coordinates associated with a Y-direction;

determining one or more words in the standardized PDF report that share the Y coordinates of the bounding boxes associated with a first text-based key of the one or more text-based keys;

sorting the one or more words in the standardized PDF report that share the Y coordinates of the bounding boxes associated with the first text-based key based on respective X coordinates in the X-direction;

determining a single word from the one or more words that is directly adjacent to the first text-based key; and controlling a display to display the single word that is directly adjacent to the first text-based key, wherein controlling the display to display the single word that is directly adjacent to the first text-based key further includes generating a graphical user interface to display the single word that is directly adjacent to the first text-based key.

13. The non-transitory computer-readable medium of claim 12, wherein the set of operations further includes determining a second one or more words in the standardized PDF report that share the Y coordinates of the bounding boxes associated with a second text-based key of the one or more text-based keys, wherein the second text-based key is different than the first text-based key;
sorting the second one or more words in the standardized PDF report that share the Y coordinates of the bounding boxes associated with the second text-based key based on respective X coordinates in the X-direction;
determining a single word from the second one or more words that is directly adjacent to the second text-based key; and
controlling the display to display the single word that is directly adjacent to the first text-based key and the single word from the second one or more words that is directly adjacent to the second text-based key.

14. The non-transitory computer-readable medium of claim 13, wherein controlling the display to display the single word that is directly adjacent to the first text-based key and the single word from the second one or more words that is directly adjacent to the second text-based key further includes generating the graphical user interface to display the single word that is directly adjacent to the first text-based key and the single word that is directly adjacent to the second text-based key.

15. The non-transitory computer-readable medium of claim 14, wherein the graphical user interface is a web interface.

16. A non-transitory computer-readable medium comprising instructions that, when executed by an electronic processor, cause the electronic processor to perform a set of operations comprising:
receiving a standardized PDF (portable document format) report that is in a non-paragraph format and a configuration file including one or more values that correspond to one or more text-based keys in the standardized PDF report;
determining X coordinates and Y coordinates of bounding boxes associated with the one or more text-based keys, the X coordinates associated with an X-direction and the Y coordinates associated with a Y-direction;
determining one or more words in the standardized PDF report that share the Y coordinates of the bounding boxes associated with a first text-based key of the one or more text-based keys;
sorting the one or more words in the standardized PDF report that share the Y coordinates of the bounding boxes associated with the first text-based key based on respective X coordinates in the X-direction;
determining a single word from the one or more words that is directly adjacent to the first text-based key;
controlling a display to display the single word that is directly adjacent to the first text-based key; and
storing the single word that is directly adjacent to the first text-based key in a database.

17. A method for extracting information from a standardized PDF (portable document format) report that is in a non-paragraph format, the method comprising:
receiving, with an electronic processor, the standardized PDF report that is in the non-paragraph format and a configuration file including one or more values that correspond to one or more text-based keys in the standardized PDF report;
determining, with the electronic processor, X coordinates and Y coordinates of bounding boxes associated with the one or more text-based keys, the X coordinates associated with an X-direction and the Y coordinates associated with a Y-direction;
determining, with the electronic processor, one or more words in the standardized PDF report that share the Y coordinates of the bounding boxes associated with a first text-based key of the one or more text-based keys;
sorting, with the electronic processor, the one or more words in the standardized PDF report that share the Y coordinates of the bounding boxes associated with the first text-based key based on respective X coordinates in the X-direction;
determining, with the electronic processor, a single word from the one or more words that is directly adjacent to the first text-based key; and
controlling, with the electronic processor, a display to display the single word that is directly adjacent to the first text-based key,
wherein controlling the display to display the single word that is directly adjacent to the first text-based key further includes generating a graphical user interface to display the single word that is directly adjacent to the first text-based key.

18. The method of claim 17, further comprising:
determining, with the electronic processor, a second one or more words in the standardized PDF report that share the Y coordinates of the bounding boxes associated with a second text-based key of the one or more text-based keys, wherein the second text-based key is different than the first text-based key;
sorting, with the electronic processor, the second one or more words in the standardized PDF report that share the Y coordinates of the bounding boxes associated with the second text-based key based on respective X coordinates in the X-direction;
determining, with the electronic processor, a single word from the second one or more words that is directly adjacent to the second text-based key; and
controlling the display to display the single word that is directly adjacent to the first text-based key and the single word from the second one or more words that is directly adjacent to the second text-based key.

19. The method of claim 18, wherein the graphical user interface is a web interface.

20. A method for extracting information from a standardized PDF (portable document format) report that is in a non-paragraph format, the method comprising:
receiving, with an electronic processor, the standardized PDF report that is in the non-paragraph format and a configuration file including one or more values that correspond to one or more text-based keys in the standardized PDF report;
determining, with the electronic processor, X coordinates and Y coordinates of bounding boxes associated with the one or more text-based keys, the X coordinates associated with an X-direction and the Y coordinates associated with a Y-direction;
determining, with the electronic processor, one or more words in the standardized PDF report that share the Y coordinates of the bounding boxes associated with a first text-based key of the one or more text-based keys;
sorting, with the electronic processor, the one or more words in the standardized PDF report that share the Y coordinates of the bounding boxes associated with the first text-based key based on respective X coordinates in the X-direction;
determining, with the electronic processor, a single word from the one or more words that is directly adjacent to the first text-based key;

controlling, with the electronic processor, a display to display the single word that is directly adjacent to the first text-based key; and storing the single word that is directly adjacent to the first text-based key in a database.

\* \* \* \* \*